(12) United States Patent
Konishi et al.

(10) Patent No.: US 11,802,178 B2
(45) Date of Patent: Oct. 31, 2023

(54) LIQUID CRYSTAL POLYESTER RESIN FOR LAMINATE, LIQUID CRYSTAL POLYESTER RESIN COMPOSITION, LAMINATE, AND LIQUID CRYSTAL POLYESTER RESIN FILM

(71) Applicant: Toray Industries, Inc., Tokyo (JP)

(72) Inventors: Akito Konishi, Nagoya (JP); Hiroshi Nakagawa, Nagoya (JP); Hideyuki Umetsu, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 331 days.

(21) Appl. No.: 17/266,136

(22) PCT Filed: Aug. 1, 2019

(86) PCT No.: PCT/JP2019/030183
§ 371 (c)(1),
(2) Date: Feb. 5, 2021

(87) PCT Pub. No.: WO2020/039878
PCT Pub. Date: Feb. 27, 2020

(65) Prior Publication Data
US 2021/0292475 A1 Sep. 23, 2021

(30) Foreign Application Priority Data
Aug. 22, 2018 (JP) ................................. 2018-155145
Nov. 20, 2018 (JP) ................................. 2018-217244

(51) Int. Cl.
| | |
|---|---|
| C08G 63/60 | (2006.01) |
| B29C 41/00 | (2006.01) |
| B29K 67/00 | (2006.01) |
| B29K 105/00 | (2006.01) |
| B29L 7/00 | (2006.01) |
| C08G 63/181 | (2006.01) |
| C08G 63/16 | (2006.01) |
| C08G 63/12 | (2006.01) |
| C08G 63/191 | (2006.01) |
| C08G 63/197 | (2006.01) |
| C08G 63/183 | (2006.01) |
| C08G 63/06 | (2006.01) |
| C08G 63/127 | (2006.01) |
| C08G 63/02 | (2006.01) |
| C08G 63/19 | (2006.01) |
| C08G 63/187 | (2006.01) |
| C08G 63/193 | (2006.01) |
| C08G 63/133 | (2006.01) |
| C08G 63/189 | (2006.01) |
| C08L 67/02 | (2006.01) |
| C08L 67/04 | (2006.01) |
| C08L 67/03 | (2006.01) |

(52) U.S. Cl.
CPC .......... *C08G 63/605* (2013.01); *B29C 41/003* (2013.01); *B29K 2067/00* (2013.01); *B29K 2105/0079* (2013.01); *B29L 2007/008* (2013.01); *B32B 2307/70* (2013.01); *B32B 2367/00* (2013.01); *C08G 63/02* (2013.01); *C08G 63/06* (2013.01); *C08G 63/065* (2013.01); *C08G 63/12* (2013.01); *C08G 63/127* (2013.01); *C08G 63/133* (2013.01); *C08G 63/16* (2013.01); *C08G 63/181* (2013.01); *C08G 63/183* (2013.01); *C08G 63/187* (2013.01); *C08G 63/189* (2013.01); *C08G 63/19* (2013.01); *C08G 63/191* (2013.01); *C08G 63/193* (2013.01); *C08G 63/197* (2013.01); *C08L 67/02* (2013.01); *C08L 67/03* (2013.01); *C08L 67/04* (2013.01); *C08L 2203/16* (2013.01); *Y10T 428/31681* (2015.04); *Y10T 428/31786* (2015.04)

(58) Field of Classification Search
None
See application file for complete search history.

(56) References Cited

U.S. PATENT DOCUMENTS

| | | |
|---|---|---|
| 2004/0210032 A1 | 10/2004 | Okamoto et al. |
| 2006/0160987 A1 | 7/2006 | Ito et al. |
| 2007/0187643 A1 | 8/2007 | Seo et al. |
| 2009/0315783 A1 | 12/2009 | Uehara et al. |
| 2012/0183697 A1 | 7/2012 | Ito et al. |
| 2014/0087086 A1* | 3/2014 | Nair ...................... C08G 69/44 524/602 |
| 2014/0087165 A1* | 3/2014 | Nair ................... C08G 63/6882 528/172 |

(Continued)

FOREIGN PATENT DOCUMENTS

| | | |
|---|---|---|
| JP | 02-84440 A | 3/1990 |
| JP | 03-59024 A | 3/1991 |

(Continued)

OTHER PUBLICATIONS

The European Search Report dated Jun. 29, 2022, of counterpart European Patent Application No. 19852831.7.

*Primary Examiner* — Vivian Chen
(74) *Attorney, Agent, or Firm* — DLA Piper LLP (US)

(57) ABSTRACT

A liquid crystal polyester resin for laminate, wherein, in a molecular weight distribution of an absolute molecular weight measured by a gel permeation chromatograph/light scattering method, an area fraction of a portion having an absolute molecular weight of 10,000 or less is 10 to 40%, and an area fraction of a portion having an absolute molecular weight of 50,000 or more is 3 to 20%, relative to 100% of the total peak area.

14 Claims, No Drawings

(56) References Cited

U.S. PATENT DOCUMENTS

| | | | | |
|---|---|---|---|---|
| 2014/0178705 A1* | 6/2014 | Nair | ...................... | C08G 63/605 |
| | | | | 428/480 |
| 2015/0275033 A1* | 10/2015 | Li | .......................... | C08G 69/44 |
| | | | | 528/125 |
| 2015/0275034 A1* | 10/2015 | Li | ........................ | C09D 167/03 |
| | | | | 524/603 |
| 2022/0315751 A1* | 10/2022 | Konishi | .................. | C08L 27/18 |

FOREIGN PATENT DOCUMENTS

| | | | |
|---|---|---|---|
| JP | 08-281817 A | | 10/1996 |
| JP | 2685815 B | * | 12/1997 |
| JP | 2002-114894 A | | 4/2002 |
| JP | 2002-294039 A | | 10/2002 |
| JP | 2004-196930 A | | 7/2004 |
| JP | 2004-269874 A | | 9/2004 |
| JP | 2004-277731 A | | 10/2004 |
| JP | 2004-315678 A | | 11/2004 |
| JP | 2006-089714 A | | 4/2006 |
| JP | 2006-225641 A | | 8/2006 |
| JP | 2007-238915 A | | 9/2007 |
| JP | 2010-031256 A | | 2/2010 |
| JP | 2012-149127 A | | 8/2012 |
| WO | 2018/056294 A1 | | 3/2018 |

* cited by examiner

LIQUID CRYSTAL POLYESTER RESIN FOR LAMINATE, LIQUID CRYSTAL POLYESTER RESIN COMPOSITION, LAMINATE, AND LIQUID CRYSTAL POLYESTER RESIN FILM

TECHNICAL FIELD

This disclosure relates to a liquid crystal polyester resin for laminate, a liquid crystal polyester resin composition, a laminate, and a liquid crystal polyester resin film, more particularly, to a liquid crystal polyester resin and a liquid crystal polyester resin composition that are suitable for production of a laminate comprising a support such as a copper foil and a resin film that are mutually laminated, and a laminate and a liquid crystal polyester resin film obtained by using the same.

BACKGROUND

Liquid crystal polyester resin has a liquid crystal structure and is therefore excellent in heat resistance, fluidity and dimensional stability. For this reason, demand is increasing mainly for applications of electric/electronic components that are required to have those properties. In particular, with the recent improvement in performance of devices, the above components are becoming smaller and thinner. Of these, a laminate obtained by laminating a metal such as a copper foil with a resin film used for flexible printed wiring boards, is extremely thin and has flexibility, leading to a great deal of spatial freedom, thus enabling three-dimensional high-density mounting. Therefore, the laminate is indispensable in reducing the size and weight of electronic devices such as mobile terminals represented by smartphones, and its applications are expanding.

There has been proposed, as an example in which a liquid crystal polyester resin is used for such a laminate, for example, an aromatic liquid crystal polyester film obtained by casting a solution composition containing an aromatic liquid crystal polyester including a structural unit derived from an aromatic amine derivative and an aprotic solvent on a support, followed by removal of the solvent (see, for example, JP 2007-238915 A). Metal adhesion is a property required for the liquid crystal polyester resin used for such applications. There have been proposed, as the liquid crystal polyester resin having improved metal adhesion, a liquid crystal polyester resin composition mixed with a liquid crystal polyester resin including a large amount of ethylene glycol units (see, for example, JP 2002-294039 A), a liquid crystalline resin in which the amount of gas in a high-temperature atmosphere is below a certain level (see, for example, JP 2006-89714 A) and the like.

Examples of the method of producing a liquid crystal polyester resin film include a solution film-forming method in which a solvent is removed after applying a solution containing a liquid crystal polyester resin. The liquid crystal polyester resin can be dissolved by heating a solvent such as phenol (for example, pentafluorophenol) in which a large number of hydrogen atoms bonded to the benzene ring are substituted with fluorine atoms, and such a solvent has a high melting point and the solution solidifies when cooled. Therefore, in solution film formation, it is necessary to again heat the solution to a high temperature of 100° C. or higher during film formation. At that time, since the temperature of the solvent is close to the boiling point, the solvent sometimes evaporates during film formation, thus causing a problem such as occurrence of cracks or uneven thickness in the film thus obtained.

To solve the above problem, there is a method in which the film formation temperature is lowered by mixing a resin solution with a solvent having a low melting point and, for example, there has been proposed to use a halogen solvent such as chloroform (for example, JP 8-281817 A and JP 2-84440 A). There has also been proposed a solution composition in which a liquid crystal polyester resin is made easily soluble by a method of reducing the liquid crystallinity of the liquid crystal polyester resin or imparting high polarity, and the liquid crystal polyester resin is dissolved in p-chlorophenol, N-methylpyrrolidone or the like. (For example, JP 2002-114894 A, JP 2004-277731 A, JP 2004-269874 A, JP 2004-196930 A and JP 2004-315678 A).

The film made of the liquid crystal polyester resin mentioned in JP '915 has insufficient metal adhesion and tensile properties because a large amount of gas is generated due to a structural unit derived from an aromatic amine derivative. The metal adhesion of the liquid crystal polyester resin composition mentioned in JP '039 and the liquid crystal resin mentioned in JP '714 was improved, but still not enough, and the tensile properties were also not sufficient.

In the methods mentioned in JP 8-281817 A and JP 2-84440 A, since a halogen solvent is a poor solvent, the liquid crystal polyester resin cannot be dissolved in a high concentration depending on the liquid crystal polyester resin used, leading to insufficient film-forming properties and crack resistance. In the methods mentioned in JP 2002-114894 A, JP 2004-277731 A, JP 2004-269874 A, JP 2004-196930 A and JP 2004-315678 A, since film-forming properties are insufficient and the solvent has a high boiling point, it is necessary to heat the solvent to a high temperature during removal the solvent, thus causing a problem such as occurrence of cracks or uneven thickness, leading to deterioration of a film shape.

It could therefore be helpful to provide a liquid crystal polyester resin for laminate that is capable of obtaining a film having excellent metal adhesion and tensile properties. It could also be helpful to provide a liquid crystal polyester resin composition having excellent solubility and is capable of handling at a low temperature and obtaining a film which is free from cracks and has a uniform thickness, a liquid crystal polyester resin film comprising the same, and a method of producing a laminate using the resin composition.

SUMMARY

We found that it is possible to obtain a film having excellent metal adhesion and tensile properties by a liquid crystal polyester resin for laminate having specific molecular weight distribution.

We thus provide:
(1) A liquid crystal polyester resin for laminate, wherein, in the molecular weight distribution of an absolute molecular weight measured by the gel permeation chromatograph/light scattering method, the area fraction of the portion having an absolute molecular weight of 10,000 or less is 10 to 40%, and the area fraction of the portion having an absolute molecular weight of 50,000 or more is 3 to 20%, relative to 100% of the total peak area.
(2) A liquid crystal polyester resin composition comprising the above liquid crystal polyester resin and a solvent, wherein 100 to 10,000 parts by weight of the solvent is included relative to 100 parts by weight of the liquid crystal polyester resin.
(3) A liquid crystal polyester resin film comprising the above liquid crystal polyester resin.

(4) A laminate comprising a support and a resin layer which are mutually laminated, wherein the support is laminated on at least one surface of the resin layer made of the above liquid crystal polyester resin.

(5) A method of producing a laminate comprising applying the above liquid crystal polyester resin composition onto a support and removing the solvent.

(6) A method of producing a liquid crystal polyester resin film comprising removing the support from the laminate obtained by the above method to obtain a liquid crystal polyester resin film.

It is possible to obtain a film having excellent metal adhesion and tensile properties. The liquid crystal polyester resin composition as excellent solubility, and is capable of handling at a low temperature and obtaining a film that is free from cracks and has a uniform thickness. Such a resin can be suitably used for a laminate used for flexible printed wiring boards and semiconductor packages in electric/electronic components and mechanical components.

DETAILED DESCRIPTION

Our resins, compositions, laminates, films and methods will be described in detail below.

Liquid Crystal Polyester Resin for Laminate

The liquid crystal polyester resin is a polyester that forms an anisotropic molten phase. Examples of such a polyester resin include polyesters composed of structural units selected to form an anisotropic molten phase from an oxycarbonyl unit, a dioxy unit, a dicarbonyl unit and the like, which will be mentioned later.

The structural units constituting the liquid crystal polyester resin will be described below.

Specific examples of the oxycarbonyl unit include structural units derived from aromatic hydroxycarboxylic acids such as p-hydroxybenzoic acid, m-hydroxybenzoic acid and 6-hydroxy-2-naphthoic acid. From the viewpoint of being capable of obtaining a film which has excellent metal adhesion and tensile properties and is free from cracks, and has a uniform thickness and excellent film-forming properties, the oxycarbonyl unit is preferably a structural unit derived from an aromatic hydroxycarboxylic acid, more preferably a structural unit derived from p-hydroxybenzoic acid or 6-hydroxynaphthoic acid, and particularly preferably a structural unit derived from p-hydroxybenzoic acid.

Specific examples of the dioxy unit include structural units derived from aromatic diols such as 4,4'-dihydroxybiphenyl, hydroquinone, resorcinol, t-butylhydroquinone, phenylhydroquinone, chlorohydroquinone, 2,6-dihydroxynaphthalene, 2,7-dihydroxynaphthalene, 3,4'-dihydroxybiphenyl, 2,2-bis(4-hydroxyphenyl) propane, 4,4'-dihydroxydiphenyl ether, 4,4'-dihydroxydiphenylsulfone, 4,4'-dihydroxydiphenylsulfide and 4,4'-dihydroxybenzophenone; structural units derived from aliphatic diols such as ethylene glycol, propylene glycol, 1,4-butanediol, 1,6-hexanediol and neopentyl glycol; structural units derived from alicyclic diols such as 1,4-cyclohexanediol and 1,4-cyclohexanedimethanol; and the like. From the viewpoint of being capable of obtaining a film having excellent metal adhesion and tensile properties and is free from cracks, and has a uniform thickness and excellent film-forming properties, the dioxy unit is preferably a structural unit derived from ethylene glycol, 4,4'-dihydroxybiphenyl or hydroquinone, and particularly preferably a structural unit derived from ethylene glycol or 4,4'-dihydroxybiphenyl.

Specific examples of the dicarbonyl unit include structural units derived from aromatic dicarboxylic acids such as terephthalic acid, isophthalic acid, 2,6-naphthalenedicarboxylic acid, 4,4'-diphenyldicarboxylic acid, 3,3'-diphenyldicarboxylic acid, 2,2'-diphenyldicarboxylic acid, 1,2-bis(phenoxy) ethane-4,4'-dicarboxylic acid, 1,2-bis(2-chlorophenoxy) ethane-4,4'-dicarboxylic acid and 4,4'-diphenyl ether dicarboxylic acid; structural units derived from aliphatic dicarboxylic acids such as adipic acid, azelaic acid, sebacic acid, dodecanedioic acid and hexahydroterephthalic acid; structural units derived from alicyclic dicarboxylic acids such as 1,4-cyclohexanedicarboxylic acid and 1,3-cyclohexanedicarboxylic acid; and the like. From the viewpoint of being capable of obtaining a film having excellent metal adhesion and tensile properties and is free from cracks, and has a uniform thickness and excellent film-forming properties, the dicarbonyl unit is preferably a structural unit derived from an aromatic dicarboxylic acid, and particularly preferably a structural unit derived from terephthalic acid or isophthalic acid.

The liquid crystal polyester resin can include structural units derived from p-aminobenzoic acid, p-aminophenol and the like, in addition to the above structural units, as long as the liquid crystallinity and properties are not impaired.

The monomer as a raw material constituting each of the above structural units is not particularly limited as long as it has a structure capable of forming each structural unit. It is possible to use an acylated product of a hydroxyl group of such a monomer, a carboxylic acid derivative such as an esterified product, an acid halide and an acid anhydride of a carboxyl group and the like.

From the viewpoint of exhibiting the liquid crystallinity and being capable of obtaining a film having excellent metal adhesion and tensile properties and is free from cracks, and has a uniform thickness, the liquid crystal polyester resin preferably includes 15 mol % or more, more preferably 30 mol % or more, and still more preferably 40 mol % or more of a structural unit derived from an aromatic hydroxycarboxylic acid, relative to 100 mol % of the total structural unit of the liquid crystal polyester resin. From the viewpoint of suppressing the formation of infusible substances and of being capable of obtaining a film having excellent metal adhesion and tensile properties and is free from cracks, and has a uniform thickness, the liquid crystal polyester resin includes preferably 80 mol % or less, more preferably 75 mol % or less, and still more preferably 70 mol % or less of a structural unit derived from an aromatic hydroxycarboxylic acid.

From the viewpoint of exhibiting the liquid crystallinity and being capable of obtaining a film having excellent metal adhesion and tensile properties and is free from cracks, and has a uniform thickness, the liquid crystal polyester resin includes preferably 3 mol % or more, more preferably 4 mol % or more, and still more preferably 5 mol % or more of a structural unit derived from an aromatic diol, relative to 100 mol % of the total structural unit of the liquid crystal polyester resin. From the viewpoint of being capable of obtaining a film having excellent metal adhesion and tensile properties and is free from cracks, and has a uniform thickness, the liquid crystal polyester resin includes preferably 20 mol % or less, more preferably 15 mol % or less, and still more preferably 10 mol % or less of a structural unit derived from an aromatic diol.

From the viewpoint of exhibiting liquid crystallinity and being capable of obtaining a film having excellent metal adhesion and tensile properties and is free from cracks, and has a uniform thickness, the liquid crystal polyester resin includes preferably 7 mol % or more, more preferably 10 mol % or more, and still more preferably 12 mol % or more of a structural unit derived from an aromatic dicarboxylic acid, relative to 100 mol % of the total structural unit of the liquid crystal polyester resin. From the viewpoint of being capable of obtaining a film having excellent metal adhesion and tensile properties and is free from cracks, and has a uniform thickness, the liquid crystal polyester resin includes preferably 40 mol % or less, more preferably 35 mol % or less, and still more preferably 30 mol % or less of a structural unit derived from an aromatic dicarboxylic acid.

From the viewpoint of being capable of obtaining a film having excellent solubility in a solvent mentioned below and is free from cracks, and has a uniform thickness and excellent metal adhesion and tensile properties, the liquid crystal polyester resin preferably includes 3 mol % or more, more preferably 5 mol % or more, and still more preferably 7 mol % or more of a structural unit derived from an aliphatic diol having 2 to 4 carbon atoms, relative to 100 mol % of the total structural unit of the liquid crystal polyester resin. From the viewpoint of exhibiting the liquid crystallinity and being capable of obtaining a film having excellent metal adhesion and tensile properties and is free from cracks, and has a uniform thickness, preferably 40 mol % or less, more preferably 35 mol % or less, and still more preferably 30 mol % or less of a structural unit derived from an aliphatic diol having 2 to 4 carbon atoms is included.

In the liquid crystal polyester resin, from the viewpoint of being capable of obtaining a film having excellent metal adhesion and tensile properties and is free from cracks, and has a uniform thickness, the total of a structural unit derived from an aromatic hydroxycarboxylic acid and a structural unit derived from terephthalic acid is preferably 60 mol % or more, more preferably 65 mol % or more, and still more preferably 68 mol % or more, relative to 100 mol % of the total structural unit of the liquid crystal polyester resin. The upper limit of the total of a structural unit derived from an aromatic hydroxycarboxylic acid and a structural unit derived from terephthalic acid is 100 mol %, but is preferably 90 mol % or less, and more preferably 85 mol % or less, from the viewpoint of being capable of obtaining a film having excellent solubility and is free from cracks, and has a uniform thickness, and has excellent metal adhesion and tensile properties by controlling the crystallinity of the liquid crystal polyester resin. Regarding the structural unit derived from an aromatic hydroxycarboxylic acid and the structural unit derived from terephthalic acid, the liquid crystal polyester resin may have either one structural unit of the above structural units and the content of the other structural unit may be 0 mol %, but the content of each of the structural units preferably exceeds 0 mol %.

From the viewpoint of being capable of obtaining a film having excellent metal adhesion and tensile properties by controlling the molecular weight distribution of the liquid crystal polyester resin to a suitable range mentioned later, a ratio of the structural unit derived from a diol unit to the structural unit derived from a dicarbonyl unit is preferably 1.01 to 1.07.

The calculation method of the content of each structural unit of the liquid crystal polyester resin is shown below. First, the liquid crystal polyester resin is weighed in a nuclear magnetic resonance (NMR) sample tube and dissolved in a solvent in which the liquid crystal polyester resin is soluble (for example, pentafluorophenol/deuterated tetrachloroethane-$d_2$ mixed solvent). Then, the solution thus obtained is subjected to $^1$H-NMR spectrum measurement and the content of each structural unit can be calculated from a ratio of peak areas derived from the respective structural units.

From the viewpoint of the heat resistance, the melting point (Tm) of the liquid crystal polyester resin is preferably 200° C. or higher, more preferably 250° C. or higher, still more preferably 280° C. or higher, and particularly preferably 300° C. or higher. From the viewpoint of being capable of obtaining a film having excellent solubility and is free from cracks, and has a uniform thickness and from the viewpoint of excellent metal adhesion and tensile properties, the melting point (Tm) of the liquid crystal polyester resin is preferably 360° C. or lower, more preferably 350° C. or lower, and still more preferably 340° C. or lower.

The melting point (Tm) is measured by differential scanning calorimetry. Specifically, first, the endothermic peak temperature ($Tm_1$) is observed by heating a polymer to be measured under temperature rising conditions of 20° C./minute from room temperature. After observing the endothermic peak temperature ($Tm_1$), the polymer is maintained at the temperature of the endothermic peak temperature ($Tm_1$)+20° C. for 5 minutes. The polymer is then cooled to room temperature under temperature falling conditions of 20° C./minute. Then, the endothermic peak temperature ($Tm_2$) is observed by heating the polymer again under temperature rising conditions of 20° C./minute. The melting point (Tm) means the endothermic peak temperature ($Tm_2$) in the second temperature rising process.

The melt viscosity of the liquid crystal polyester resin is preferably 1 Pa·s or more, more preferably 3 Pa·s or more, and still more preferably 5 Pa·s or more, from the viewpoint of being capable of obtaining a film which has excellent metal adhesion and tensile properties because of excellent strength and is free from cracks, and has a uniform thickness. The melt viscosity of the liquid crystal polyester resin is preferably 35 Pas or less, preferably 20 Pas or less, and still more preferably 10 Pa·s or less, from the viewpoint of being capable of obtaining a film free from cracks and has a uniform thickness because the liquid crystal polyester resin has excellent solubility when a composition mentioned later is prepared, and from the viewpoint of being capable of obtaining a film having excellent metal adhesion and tensile properties.

This melt viscosity is the value measured by an Koka-type flow tester under conditions of a temperature of the melting point (Tm) of the liquid crystal polyester resin+10° C. and a shear rate of 1,000/second.

We found that a film having excellent metal adhesion and tensile properties can be obtained when the liquid crystal polyester resin has the molecular weight distribution which is wide to some extent.

Specifically, in the liquid crystal polyester resin, the area fraction of the portion having an absolute molecular weight of 10,000 or less is 10 to 40% relative to 100% of the total peak area of the molecular weight distribution of the absolute molecular weight measured by the gel permeation chromatograph/light scattering method. If the area fraction of the portion having an absolute molecular weight of 10,000 or less is less than 10%, the solubility of the liquid crystal polyester resin is significantly decreased when a composition mentioned later is prepared. When the terminal group of the liquid crystal polyester resin is reduced, the metal adhesion significantly deteriorates when formed into a film. Since a film having excellent metal adhesion can be obtained, the area fraction of the portion having an absolute molecular weight of 10,000 or less is more preferably 12% or more, and still more preferably 13% or more. If the area fraction of the portion having an absolute molecular weight of 10,000 or less is more than 40%, it becomes brittle when formed into a film, leading to significant deterioration of the metal adhesion and tensile properties. From the viewpoint of being capable of obtaining a film having excellent metal adhesion and tensile properties, the area fraction of the portion having an absolute molecular weight of 10,000 or less is more preferably 35% or less, and still more preferably 30% or less.

In the liquid crystal polyester resin, the area fraction of the portion having an absolute molecular weight of 50,000 or more is 3 to 20% relative to 100% of the total peak area of the molecular weight distribution of the absolute molecular weight measured by the gel permeation chromatograph/light scattering method. If the area fraction of the portion having an absolute molecular weight of 50,000 or more is less than 3%, it becomes brittle when formed into a film, leading to significant deterioration of the metal adhesion and tensile properties. From the viewpoint of being capable of obtaining a film having excellent metal adhesion and tensile properties, the area fraction of the portion having an absolute molecular weight of 50,000 or more is more preferably 5% or more, and still more preferably 7% or more. If the area fraction of the portion having an absolute molecular weight of 50,000 or more is more than 20%, the solubility of the liquid crystal polyester resin is significantly decreased when a composition mentioned later is prepared. When the terminal group of the liquid crystal polyester resin is reduced, the metal adhesion significantly deteriorates when formed into a film, and also the tensile properties in especially tensile elongation significantly deteriorate. Since a film having excellent metal adhesion and tensile properties can be obtained, the area fraction of the portion having an absolute molecular weight of 50,000 or more is more preferably 17% or less, and still more preferably 15% or less.

The absolute number-average molecular weight of the liquid crystal polyester resin is preferably 3,000 or more, more preferably 5,000 or more, and still more preferably 7,000 or more, from the viewpoint of being capable of obtaining a film having excellent metal adhesion and tensile properties because the strength of the film is improved. From the viewpoint of improving the solubility of the liquid crystal polyester resin and being capable of obtaining a film having excellent metal adhesion and tensile properties, the absolute number-average molecular weight is preferably 17,000 or less, more preferably 15,000 or less, and still more preferably 13,000 or less.

The absolute weight-average molecular weight of the liquid crystal polyester resin is preferably 10,000 or more, more preferably 13,000 or more, and more preferably 15,000 or more, from the viewpoint of being capable of obtaining a film having excellent metal adhesion and tensile properties because the strength of the film is improved. From the viewpoint of improving the solubility of the liquid crystal polyester resin and of being capable of obtaining a film having excellent metal adhesion and tensile properties, the absolute weight-average molecular weight is preferably 40,000 or less, more preferably 37,000 or less, and still more preferably 35,000 or less.

The polydispersity, which is the value obtained by dividing the absolute weight-average molecular weight of the liquid crystal polyester resin by the absolute number-average molecular weight, is preferably 2.2 or more, more preferably 2.3 or more, and still more preferably 2.4 or more, from the viewpoint of being capable of obtaining a film having excellent metal adhesion and tensile properties. From the viewpoint of being capable of obtaining a film having excellent metal adhesion and tensile properties, the polydispersity is preferably 3.5 or less, more preferably 3.3 or less, and still more preferably 3.0 or less.

The absolute molecular weight can be measured by the GPC/light scattering method (gel permeation chromatography/light scattering method) using, as an eluent, a solvent in which the liquid crystal polyester resin is soluble. Examples of the solvent in which the liquid crystal polyester is soluble include halogenated phenols and a mixed solvent of halogenated phenol and a common organic solvent. The solvent is preferably pentafluorophenol or a mixed solvent of pentafluorophenol and chloroform, and particularly preferably a pentafluorophenol/chloroform mixed solvent from the viewpoint of the handleability.

For the liquid crystal polyester resin to control the area fraction of the portion having an absolute molecular weight of 10,000 or less or 50,000 or more within the above suitable range, methods (A) to (C) can be exemplified.

(A) A method in which the acetylation reaction time at the internal temperature of 140° C. to 145° C. is set at 40 to 100 minutes in the acetylation reaction of phenolic hydroxyl groups when a liquid crystal polyester resin is produced by the method mentioned later.

(B) A method in which the amount of acetic anhydride is set at 1.00 to 1.08 molar equivalents of the total phenolic hydroxyl groups of the liquid crystal polyester resin raw material when the liquid crystal polyester resin is produced by the method mentioned later.

(C) A method in which a ratio of the structural unit derived from a diol unit of the liquid crystal polyester resin to the structural unit derived from a dicarbonyl unit is set at 1.01 to 1.07.

By the above methods, the molecular weight distribution can be controlled by controlling the polymerization rate, and the area fraction of the absolute molecular weight of 10,000 or less or 50,000 or more can be controlled within the above suitable range. Of these, method (A) is preferable.

Method of Producing Liquid Crystal Polyester Resin for Laminate

The method of producing a liquid crystal polyester resin is not particularly limited, and the liquid crystal polyester resin can be produced according to a known polycondensation method of a polyester. Specifically, using a liquid crystal polyester resin composed of a structural unit derived from p-hydroxybenzoic acid, a structural unit derived from 4,4'-dihydroxybiphenyl, a structural unit derived from terephthalic acid and a structural unit derived from ethylene glycol as an example, the following method can be exemplified.

(1) A method in which a liquid crystal polyester resin is produced by acetic acid-eliminating polycondensation from p-acetoxybenzoic acid, 4,4'-diacetoxybiphenyl and terephthalic acid, and a polymer or an oligomer of polyethylene terephthalate, or bis(β-hydroxyethyl)terephthalate.

(2) A method in which p-hydroxybenzoic acid, 4,4'-diahydroxybiphenyl and terephthalic acid, and a polymer or an oligomer of a polyester such as polyethylene terephthalate, or bis(β-hydroxyethyl)terephthalate are reacted with acetic anhydride to thereby acetylate a phenolic hydroxyl group, and then a liquid crystal polyester resin is produced by an acetic acid-eliminating polycondensation reaction.

(3) A method in which 1,2-bis(4-hydroxybenzoyl)ethane is used as a part of starting materials in the production method (1) or (2) as mentioned in JP 3-59024 A.

Of these, method (2) is preferably used because it is industrially excellent in controlling the degree of polymerization of the liquid crystal polyester resin.

In producing by method (2), it is easy to control the molecular weight distribution of the liquid crystal polyester resin within the above suitable range, and the amount of acetic anhydride is preferably 1.00 to 1.08 molar equivalents, and more preferably 1.02 to 1.08 molar equivalents of the total of phenolic hydroxyl groups of the polyester resin raw material, from the viewpoint of excellent metal adhesion and tensile properties.

By controlling the polymerization rate to be slow in the acetylation reaction of the phenolic hydroxyl group, it is possible to control the molecular weight distribution of the thus obtained liquid crystal polyester resin to be wide. By controlling the polymerization rate to be moderately slow, the acetylation reaction time at the internal temperature of 140° C. to 145° C. is preferably set at 110 minutes or less, more preferably 100 minutes or less, and still more preferably 90 minutes or less, from the viewpoint of controlling the area fraction of the portion having an absolute molecular weight of 10,000 or less and the portion having an absolute molecular weight of 50,000 or more in the thus obtained liquid crystal polyester resin within the above suitable range. By controlling the polymerization rate to such an extent that it does not become excessively slow, the acetylation reaction time at the internal temperature of 140 to 145° C. is preferably set at 40 minutes or more, more preferably 45 minutes or more, and still more preferably 50 minutes or more, from the viewpoint of controlling the area fraction of the portion having an absolute molecular weight of 10,000 or less and the portion having an absolute molecular weight of 50,000 or more in the thus obtained liquid crystal polyester resin within the above suitable range. Since the temperature at which the acetylation reaction efficiently proceeds is 140° C. or higher and the temperature at which acetic acid as a by-product begins to distill out is 145° C., attention was focused on the acetylation reaction at the internal temperature of 140 to 145° C.

As the method of producing a liquid crystal polyester resin, it is also possible to complete the polycondensation reaction by a solid phase polymerization method. Examples of the treatment by the solid phase polymerization method include the following method. First, a polymer or an oligomer of the liquid crystal polyester resin is pulverized by a pulverizer. The reaction is completed by heating the pulverized polymer or oligomer under a nitrogen stream or under reduced pressure and polycondensing to the desired degree of polymerization. The heating is preferably performed at the melting point−50° C. to the melting point−5° C. (for example, 200 to 300° C.) of the liquid crystal polyester for 1 to 50 hours.

The polycondensation reaction of the liquid crystal polyester resin proceeds in the absence of a catalyst, and it is also possible to use, as the catalyst, stannous acetate, tetrabutyl titanate, potassium acetate and sodium acetate, antimony trioxide, metallic magnesium and the like.

Liquid Crystal Polyester Resin Composition

The liquid crystal polyester resin can be used in various applications as a liquid crystal polyester resin and a liquid crystal polyester resin composition containing a solvent because of its excellent solubility in a solvent. The liquid crystal polyester resin composition may be in any of a state where the liquid crystal polyester resin remains without being dissolved, a state where the liquid crystal polyester resin is completely dissolved and liquefied, and a state where the liquid crystal polyester resin is dissolved and then the thus obtained solution is solidified by cooling.

The method of producing such a liquid crystal polyester resin composition will be described. The solvent used to produce a liquid crystal polyester resin composition is not particularly limited as long as it can dissolve the liquid crystal polyester resin, and examples thereof include halogenated phenols, halogenated alcohol, and mixed solvents of the above solvents and other organic solvents.

The liquid crystal polyester resin composition preferably includes 100 parts by weight or more, more preferably 150 parts by weight or more, and still more preferably 200 parts by weight or more of the solvent, relative to 100 parts by weight of the liquid crystal polyester resin, from the viewpoint of being capable of uniformly applying to a support by controlling the solution viscosity to such an extent that it does not become excessively high, and obtaining a film having excellent metal adhesion and tensile properties when formed into a film, and is free from cracks and has a uniform thickness. From the viewpoint of being capable of uniformly applying in a support by ensuring the solution viscosity, and obtaining a film having excellent metal adhesion and tensile properties when formed into a film, and is free from cracks and has a uniform thickness, the liquid crystal polyester resin composition preferably includes 10,000 parts by weight or less, more preferably 5,000 parts by weight or less, and still more preferably 2,000 parts by weight or less of the solvent, relative to 100 parts by weight of the liquid crystal polyester resin.

From the viewpoint of excellent solubility, it is preferable that the liquid crystal polyester resin composition includes 100 parts by weight or more of a phenol (A) in which three or more hydrogen atoms bonded to the benzene ring are substituted with fluorine atoms (hereinafter sometimes referred to as solvent (A)) relative to 100 parts by weight of the liquid crystal polyester resin. The solvent (A) is a solvent having excellent solubility of the liquid crystal polyester resin. From the viewpoint of excellent solubility, the content of the solvent (A) is preferably 150 parts by weight or more, and more preferably 200 parts by weight or more. From the viewpoint of being capable of uniformly forming a film having excellent metal adhesion and tensile properties and is free from cracks, and has a large thickness due to appropriate solution concentration, it is preferable that the liquid crystal polyester resin composition includes 3,000 parts by weight or less of the solvent (A) relative to 100 parts by weight of the liquid crystal polyester resin. The content of the solvent (A) is more preferably 2,500 parts by weight or less, still more preferably 2,000 parts by weight or less, and particularly preferably 1,500 parts by weight or less.

Specific examples of the solvent (A) include 3,4,5-trifluorophenol, 2,4,6-trifluorophenol, 2,3,4-trifluorophenol, 2,3,5,6-tetrafluorophenol, 2,3,4,5-tetrafluorophenol and pentafluorophenol, and pentafluorophenol is particularly preferable from the viewpoint of excellent solubility.

Although such a solvent (A) has excellent solubility, it has a melting point higher than 30° C. and is solid at room temperature so that it is necessary to heat the solution to a high temperature during film formation. It is preferable that the liquid crystal polyester resin composition further includes a protic solvent (B) having a melting point of 30° C. or lower (hereinafter sometimes referred to as solvent (B)) so that the liquid crystal polyester resin composition can be liquefied at a lower temperature, from the viewpoint of being capable of obtaining a film free from cracks and has a uniform thickness. From the viewpoint of being capable of obtaining a film that can be liquefied at a lower temperature and is free from cracks, and has a uniform thickness, the melting point of the solvent (B) is preferably 25° C. or lower, and more preferably 20° C. or lower. The lower limit of the melting point of the solvent (B) is not particularly limited.

From the viewpoint of suppressing the decomposition of the liquid crystal polyester resin and being capable of obtaining a film free from cracks and has a uniform thickness, the solvent (B) preferably has an acid dissociation constant (pKa) of 4 to 12. The lower the pKa of the solvent (B), the more the solubility of the liquid crystal polyester resin is improved, thus making it possible to obtain a film free from cracks and has a uniform thickness. Therefore, the pKa is preferably 12 or less, more preferably 11 or less, and still more preferably 10 or less. Meanwhile, if the pKa of the solvent (B) is too low, the decomposition of the liquid crystal polyester resin may be promoted. Therefore, the pKa is preferably 4 or more, more preferably 4.5 or more, and still more preferably 5 or more. The acid dissociation constant (pKa) is the numerical value in water at 25° C. and can be calculated by the method mentioned in *KagakuBinran Kisohen* (Handbook of Chemistry: Fundamentals Section) (Revised 5th edition 11-331 to 11-343 (edited by the Chemical Society of Japan, published by Maruzen Co., Ltd.).

From the viewpoint of being capable of liquefying at a lower temperature and being capable of obtaining a film free from cracks and has a uniform thickness, the content of the solvent (B) is preferably 1 part by weight or more, more preferably 10 parts by weight or more, and still more preferably 50 parts by weight or more, relative to 100 parts by weight of the liquid crystal polyester resin. From the viewpoint of being capable of uniformly forming a film free from cracks and has a large thickness by improving the solubility of the liquid crystal polyester resin and improving the viscosity of the solution, the content of the solvent (B) is preferably 1,500 parts by weight or less, more preferably 1,200 parts by weight or less, and still more preferably 1,000 parts by weight or less, relative to 100 parts by weight of the liquid crystal polyester resin.

The solvent (B) may be any protic solvent that satisfies the above melting point and pKa range, and is preferably phenols or alcohols, and more preferably phenols, from the viewpoint of suppressing the decomposition of the liquid crystal polyester resin and having excellent solubility, and of being capable of obtaining a film free from cracks and has a uniform thickness. Examples of alcohols satisfying the above melting point and pKa range include fluoroalcohols in which at least a part of hydrogen atoms are substituted with fluorine atoms, and hexafluoroisopropanol is preferable. Examples of phenols satisfying the above melting point and pKa range include compounds in which at least a part of hydrogen atoms on the benzene ring are substituted with alkyl groups, halogen groups, trifluoromethyl groups and the like. Of these, preferred are compounds in which at least a part of hydrogen atoms on the benzene ring are substituted with halogen groups or trifluoromethyl groups. Specific examples of such compounds include o-fluorophenol, m-fluorophenol, o-chlorophenol, o-bromophenol, 4-chloro-2-fluorophenol, 2-chloro-4-fluorophenol, 3,5-bis(trifluoromethyl)phenol and the like.

The boiling point of the solvent (B) is preferably 200° C. or lower, and more preferably 180° C. or lower, from the viewpoint that the solvent (B) can be removed at a low temperature during film formation and productivity is excellent, and that a film free from cracks and has a uniform thickness can be obtained. The boiling point of the solvent (B) is preferably 60° C. or higher, more preferably 80° C. or higher, and still more preferably 100° C. or higher, from the viewpoint of the solubility of the liquid crystal polyester resin and obtaining a film free from cracks and has a uniform thickness because the solvent does not easily volatilize during film formation.

The mixing ratio of the solvent (A) and the solvent (B) is not particularly limited as long as it is a mixing ratio that enables dissolution of the liquid crystal polyester resin. From the viewpoint of being excellent in solubility and being capable of obtaining a film free from cracks and has a uniform thickness, the content of the solvent (A) is preferably 35% by weight or more, more preferably 45% by weight or more, and still more preferably 50% by weight or more, when the total amount of the solvent (A) and the solvent (B) is 100% by weight. From the viewpoint of being capable of easily liquefying at a lower temperature and of obtaining a film free from cracks and has a uniform thickness, the content of the solvent (A) is preferably 99% by weight or less, more preferably 95% by weight or less, and still more preferably 90% by weight or less.

The liquid crystal polyester resin composition is preferably liquid at the temperature of 100° C. or lower, more preferably 90° C. or lower, and still more preferably 80° C. or lower, from the viewpoint of being excellent in productivity and being capable of obtaining a film free from cracks and has a uniform thickness. The liquid as used herein means a liquid which flows within 10 seconds when the container containing the liquid crystal polyester resin composition is tilted by 90 degrees.

The solvents other than the solvent (A) and the solvent (B) may be added as long as the solubility of the liquid crystal polyester resin is not impaired. The liquid crystal polyester resin composition may be filtered through a filter as necessary to remove fine foreign substances contained in the composition.

Filler

Known fillers, additives and the like may be included in the liquid crystal polyester resin for laminate or the liquid crystal polyester resin composition as long as the desired effects are not impaired.

Examples of the filler include fillers such as fibrous fillers, whisker-like fillers, plate-like fillers, powdery fillers and granular fillers. Specific examples of fibrous fillers or whisker-like fillers include glass fibers, PAN-based or pitch-based carbon fibers, metal fibers such as stainless steel fibers, aluminum fibers and brass fibers, organic fibers such as aromatic polyamide fibers and liquid crystal polyester fibers, gypsum fibers, ceramic fibers, asbestos fibers, zirconia fibers, alumina fibers, silica fibers, titanium oxide fibers, silicon carbide fibers, rock wools, potassium titanate whiskers, barium titanate whiskers, aluminum borate whiskers, silicon nitride whiskers and acicular titanium oxides. Examples of plate-like fillers include mica, talc, kaolin, glass flakes, clay, molybdenum disulfide and wollastonite. Examples of powdery fillers or granular fillers include silica, glass beads, titanium oxide, zinc oxide, calcium polyphosphate and graphite. The surface of the above fillers may be treated with a known coupling agent (for example, a silane-based coupling agent, a titanate-based coupling agent and the like) and other surface treatment agents. Two or more kinds of fillers may be used in combination.

It is possible to mix, as additives, common additives selected from antioxidants, heat stabilizers (for example, hindered phenol, hydroquinone, phosphite, thioethers and substitutes thereof), UV absorbers (for example, resorcinol, salicylate), anti-colorants such as phosphites and hypophosphites, lubricants and mold release agents (such as montanic acid and metal salts thereof, esters thereof, half esters thereof, stearyl alcohols, stearamides and polyethylene waxes), colorants including dyes or pigments, carbon black as conductive agents or colorants, crystal nucleating agents, plasticizers, flame retardants (bromine-based flame retardants, phosphorus-based flame retardants, red phosphorus, silicone-based flame retardants and the like), flame retardant aids and antistatic agents.

Liquid Crystal Polyester Resin Film and Laminate

The liquid crystal polyester resin for laminate and the liquid crystal polyester resin composition can be used as raw materials in producing a liquid crystal polyester resin film and a laminate.

The liquid crystal polyester resin film is made of the liquid crystal polyester resin. The liquid crystal polyester resin film can be produced, for example, by method (I) or (II).

(I) A method in which the liquid crystal polyester resin is melt-extruded onto a support by, for example, a single-screw extruder, a twin-screw extruder, a vent extruder, a tandem extruder or the like to obtain a laminate, and then the support is removed from the laminate thus obtained.

(II) A method in which the liquid crystal polyester resin composition is applied onto a support and the solvent is removed to obtain a laminate, and then the support is removed from the laminate thus obtained.

From the viewpoint of reducing the anisotropy peculiar to the liquid crystal polyester resin and being capable of obtaining a film having excellent metal adhesion and tensile properties and is free from cracks, and has a uniform film thickness, and obtaining the liquid crystal polyester resin film by simple operation, the method (II) is preferable.

The laminate comprises a support and a resin layer that are mutually laminated, the support being laminated on at least one surface of a resin layer made of the liquid crystal polyester resin. The laminate can be produced, for example, by methods (III) to (VI).

(III) A method in which the liquid crystal polyester resin composition is applied onto a support, and then a solvent is removed.

(IV) A method in which the film produced by method (I) or (II) is attached to a support by thermal bonding.

(V) A method in which the film produced by method (I) or (II) and a support are attached with an adhesive.

(VI) A method in which a support is formed on the film produced by method (I) or (II) by vapor deposition.

From the viewpoint that a resin layer having a uniform thickness can be easily formed, and when the support is a metal foil, a laminate having high adhesion between the resin layer and the metal foil can be obtained, and the viewpoint of excellent tensile properties, method (III) is preferable.

The support used in methods (II) to (VI) is not particularly limited and is selected from a metal foil, a glass substrate, a polymer film and the like. In the supports used in methods (II) and (III), it is important that they are resistant to the solvent used. The support may be a simple substance such as a metal foil, a glass substrate or a polymer film, or a composite material thereof. Examples of the polymer film include a polyimide film, a liquid crystal polyester film, a cycloolefin polymer film and a polypropylene film each having insulation properties.

Examples of the metal used when the support is a metal foil in methods (III) to (V) and when the support is a metal layer in method (VI) include gold, silver, copper, nickel, aluminum and the like. Copper is preferable for flexible printed wiring board applications.

The method of producing a laminate by method (III) will be described below.

Examples of the method of applying the liquid crystal polyester resin composition onto the support include various means such as a roller coating method, a dip coating method, a spray coater method, a spinner coating method, a curtain coating method, a slot coating method and a screen printing method. Using these means, the liquid crystal polyester resin composition is cast flatly and uniformly on a support to form a coating film.

Subsequently, a liquid crystal polyester resin layer is formed on a surface of the support by removing the solvent in the coating film. The method of removing the solvent is preferably performed by evaporation of the solvent. Examples of the method of evaporating the solvent include methods such as heating, depressurization and ventilation. From the viewpoint of suppressing rapid evaporation of the solvent and being capable of obtaining a film free from cracks and has a uniform thickness, it is preferable to remove the solvent by heating. The heating temperature is not particularly limited as long as the solvent volatilizes, but the temperature is preferably lower than the boiling point of the solvent, from the viewpoint of suppressing rapid evaporation of the solvent and being capable of obtaining a film free from cracks and has a uniform film. Therefore, it is preferable to heat at the temperature higher than room temperature and lower than the boiling point of the solvent.

After forming the laminate in this way, a heat treatment may be further performed as necessary from the viewpoint of improving the tensile properties. The method of the heat treatment is not particularly limited, and the heat treatment can be performed using an apparatus such as a hot air oven, a decompression oven or a hot plate. The heat treatment may be performed under atmospheric pressure or under pressure or reduced pressure as long as the support and the liquid crystal polyester resin do not deteriorate. From the viewpoint of suppressing deterioration of the liquid crystal polyester resin, it is preferable to perform the heat treatment in an atmosphere of inert gas. For example, the heat treatment can be performed by raising the temperature at the melting point−50° C. to the melting point−5° C. to the melting point+5° C. to the melting point+50° C. of the liquid crystal polyester resin over is to 50 hours in a nitrogen stream.

Examples of the structure of the laminate obtained in this manner includes a two-layered structure of a film and a support, a three-layered structure in which a support is laminated on both surfaces of the film, a three-layered structure in which a film is laminated on both surfaces of the support, and a multi-layered structure in which four or more layers of a film and a support are alternately laminated.

The laminate obtained by the above method is used for, for example, electric/electronic components represented by various computers, OA equipment and AV equipment, and circuit boards such as flexible printed wiring boards and rigid printed wiring boards on which electric/electronic components are mounted; semiconductor package used for in-vehicle semiconductors, industrial semiconductors and the like; base materials of a transparent conductive film, base materials of a polarizing film, packaging films for various cooked foods and microwave heating, films for electromagnetic wave shielding, antibacterial films, gas separation films and the like. Since it is possible to easily obtain a laminate which is free from cracks and has a uniform thickness, and also has high metal adhesion and excellent film tensile properties, the laminate is suitably used for circuit boards such as flexible printed wiring boards and rigid printed wiring boards in electric/electronic components and mechanical components which use a laminate, and semiconductor packages.

EXAMPLES

Hereinafter, our resins, compositions, laminates, films and methods will be described by way of Examples, but this disclosure is not limited to the Examples. In the Examples, the composition and evaluation of properties of the liquid crystal polyester resin were measured by the following methods.

(1) Composition Analysis of Liquid Crystalline Polyester Resin

Composition analysis of the liquid crystalline polyester resin was performed by $^1$H-nuclear magnetic resonance spectroscopy ($^1$H-NMR). After weighing 50 mg of the liquid crystalline polyester resin in an NMR sample tube, the liquid crystalline polyester resin was dissolved in 800 μL of a solvent (pentafluorophenol/1,1,2,2,-tetrachloroethane-$d_2$=65/35 (weight ratio) mixed solvent), and then $^1$H-NMR measurement was performed under conditions of the spectral frequency of 500 MHz and the temperature of 80° C. using UNITY INOVA 500 NMR spectrometer (manufactured by Varian, Inc). The composition of the liquid crystalline polyester resin was analyzed from a ratio of peak areas derived from the respective structural units observed in the spectral range of about 7 to 9.5 ppm.

(2) Measurement of Absolute Molecular Weight of Liquid Crystal Polyester Resin

The absolute molecular weight distribution of the liquid crystalline polyester resin was measured by gel permeation chromatography (GPC)/LALLS method under the following conditions, and then the absolute number-average molecular weight, the absolute weight-average molecular weight, the area fraction of the portion having an absolute molecular weight of 10,000 or less, and the area fraction of the portion having an absolute molecular weight of 50,000 or more were determined.

GPC
GPC Apparatus: Manufactured by Waters Corporation
Detector: Differential refractive index detector RI2410 (manufactured by Waters Corporation)
Column: Shodex K-806M (two) and K-802 (one) (manufactured by Showa Denko K.K.)
Eluent: Pentafluorophenol/chloroform (35/65 w/w %)
Measurement Temperature: 23° C.
Flow Rate: 0.8 mL/min
Sample Injection Volume: 200 μL (concentration: 0.1%)
LALLS
Device: Low-angle laser light scattering photometer KMX-6 (manufactured by Chromatix, Inc.)
Detector Wavelength: 633 nm (He—Ne)
Detector Temperature: 23° C.

(3) Melting Point (Tm) of Liquid Crystal Polyester Resin

After observation of an endothermic peak temperature ($Tm_1$) observed when heating under temperature rising conditions of 20° C./minute from room temperature using a differential scanning calorimeter DSC-7 (manufactured by PerkinElmer, Inc.), the liquid crystal polyester resin was maintained at a temperature of $Tm_1+20°$ C. for 5 minutes, followed by observation of the endothermic peak temperature ($Tm_2$) observed when the temperature is once fallen to room temperature under temperature falling conditions of 20° C./minute and then raised again under temperature rising conditions of 20° C./minute. The endothermic peak temperature ($Tm_2$) is defined as the melting point (Tm).

(4) Measurement of Melt Viscosity of Liquid Crystalline Polyester Resin

Using a Koka-type flow tester CFT-500D (orifice: 0.5φ× 10 mm) (manufactured by Shimadzu Corporation), the melt viscosity was measured under conditions of Tm+10° C. and the shear rate of 1,000/second.

Example 1

In a 5 L reaction vessel equipped with a stirring blade and a distillation tube, 994 parts by weight of p-hydroxybenzoic acid, 126 parts by weight of 4,4'-dihydroxybiphenyl, 112 parts by weight of terephthalic acid, 216 parts by weight of polyethylene terephthalate having an intrinsic viscosity of about 0.6 dl/g, and 960 parts by weight (1.10 equivalents of the total of phenolic hydroxyl groups) of acetic anhydride were charged and, after reacting at 145° C. for 80 minutes while stirring in a nitrogen gas atmosphere, the temperature was raised from 145° C. to 320° C. over 4 hours. At this time, the reaction time at an internal temperature of 140 to 145° C. was 75 minutes. Thereafter, the polymerization temperature was maintained at 320° C. and the pressure was reduced to 1.0 mmHg (133 Pa) over 1.0 hour, and after continuously reacting for additional 20 minutes, the polymerization was completed when the torque required for stirring reached 20 kg·cm. Then, the inside of the reaction vessel was pressurized to 1.0 kg/cm' (0.1 MPa) and the polymer was extruded into strands through a spinneret with one circular outlet having a diameter of 10 mm, followed by pelletization using a cutter to obtain a liquid crystal polyester resin (a-1).

When the composition of this liquid crystal polyester resin (a-1) was analyzed, the structural unit derived from p-hydroxybenzoic acid was 66.7 mol %, the structural unit derived from 4,4'-dihydroxybiphenyl was 6.3 mol %, the structural unit derived from terephthalic acid was 16.7 mol %, and the structural unit derived from ethylene glycol was 10.4 mol %. Tm was 313° C., the melt viscosity was 13 Pa·s, the absolute number-average molecular weight was 10,000, and the absolute weight-average molecular weight was 26,000.

Example 2

In a 5 L reaction vessel equipped with a stirring blade and a distillation tube, 994 parts by weight of p-hydroxybenzoic acid, 126 parts by weight of 4,4'-dihydroxybiphenyl, 112 parts by weight of terephthalic acid, 216 parts by weight of polyethylene terephthalate having an intrinsic viscosity of about 0.6 dl/g, and 943 parts by weight (1.08 equivalents of the total of phenolic hydroxyl groups) of acetic anhydride were charged and, after reacting at 145° C. for 80 minutes while stirring in a nitrogen gas atmosphere, the temperature was raised from 145° C. to 320° C. over 4 hours. At this time, the reaction time at the internal temperature of 140 to 145° C. was 75 minutes. Thereafter, the polymerization temperature was maintained at 320° C. and the pressure was reduced to 1.0 mmHg (133 Pa) over 1.0 hour, and after continuously reacting for additional 30 minutes, the polymerization was completed when the torque required for stirring reached 20 kg·cm. Then, the inside of the reaction vessel was pressurized to 1.0 kg/cm' (0.1 MPa) and the polymer was extruded into strands through a spinneret with one circular outlet having a diameter of 10 mm, followed by pelletization using a cutter to obtain a liquid crystal polyester resin (a-2).

When the composition of this liquid crystal polyester resin (a-2) was analyzed, the structural unit derived from p-hydroxybenzoic acid was 66.7 mol %, the structural unit derived from 4,4'-dihydroxybiphenyl was 6.3 mol %, the structural unit derived from terephthalic acid was 16.7 mol %, and the structural unit derived from ethylene glycol was 10.4 mol %. Tm was 313° C., the melt viscosity was 13 Pa·s, the absolute number-average molecular weight was 9,500, and the absolute weight-average molecular weight was 26,500.

Example 3

In a 5 L reaction vessel equipped with a stirring blade and a distillation tube, 994 parts by weight of p-hydroxybenzoic acid, 134 parts by weight of 4,4'-dihydroxybiphenyl, 112 parts by weight of terephthalic acid, 216 parts by weight of polyethylene terephthalate having an intrinsic viscosity of about 0.6 dl/g, and 960 parts by weight (1.10 equivalents of the total of phenolic hydroxyl groups) of acetic anhydride were charged and, after reacting at 145° C. for 80 minutes while stirring in a nitrogen gas atmosphere, the temperature was raised from 145° C. to 320° C. over 4 hours. At this time, the reaction time at the internal temperature of 140 to 145° C. was 75 minutes. Thereafter, the polymerization temperature was maintained at 320° C. and the pressure was reduced to 1.0 mmHg (133 Pa) over 1.0 hour, and after continuously reacting for additional 30 minutes, the polymerization was completed when the torque required for stirring reached 20 kg·cm. Then, the inside of the reaction vessel was pressurized to 1.0 kg/cm' (0.1 MPa) and the polymer was extruded into strands through a spinneret with one circular outlet having a diameter of 10 mm, followed by pelletization using a cutter to obtain a liquid crystal polyester resin (a-3).

When the composition of this liquid crystal polyester resin (a-3) was analyzed, the structural unit derived from p-hydroxybenzoic acid was 66.4 mol %, the structural unit derived from 4,4'-dihydroxybiphenyl was 6.6 mol %, the structural unit derived from terephthalic acid was 16.6 mol %, and the structural unit derived from ethylene glycol was 10.4 mol %. Tm was 313° C., the melt viscosity was 13 Pa·s, the absolute number-average molecular weight was 9,500, and the absolute weight-average molecular weight was 26,500.

Example 4

In a 5 L reaction vessel equipped with a stirring blade and a distillation tube, 976 parts by weight of p-hydroxybenzoic acid, 126 parts by weight of 4,4'-dihydroxybiphenyl, 112 parts by weight of terephthalic acid, 242 parts by weight of polyethylene terephthalate having an intrinsic viscosity of about 0.6 dl/g, and 945 parts by weight (1.10 equivalents of the total of phenolic hydroxyl groups) of acetic anhydride were charged and, after reacting at 145° C. for 75 minutes while stirring in a nitrogen gas atmosphere, the temperature was raised from 145° C. to 310° C. over 4 hours. At this time, the reaction time at the internal temperature of 140 to 145° C. was 70 minutes. Thereafter, the polymerization temperature was maintained at 310° C. and the pressure was reduced to 1.0 mmHg (133 Pa) over 1.0 hour, and after continuously reacting for additional 20 minutes, the polymerization was completed when the torque required for stirring reached 20 kg·cm. Then, the inside of the reaction vessel was pressurized to 1.0 kg/cm' (0.1 MPa) and the polymer was extruded into strands through a spinneret with one circular outlet having a diameter of 10 mm, followed by pelletization using a cutter to obtain a liquid crystal polyester resin (a-4).

When the composition of this liquid crystal polyester resin (a-4) was analyzed, the structural unit derived from p-hydroxybenzoic acid was 64.6 mol %, the structural unit derived from 4,4'-dihydroxybiphenyl was 6.2 mol %, the structural unit derived from terephthalic acid was 17.7 mol %, and the structural unit derived from ethylene glycol was 11.5 mol %. Tm was 300° C., the melt viscosity was 13 Pa·s, the absolute number-average molecular weight was 10,000, and the absolute weight-average molecular weight was 25,500.

Example 5

In a 5 L reaction vessel equipped with a stirring blade and a distillation tube, 901 parts by weight of p-hydroxybenzoic acid, 126 parts by weight of 4,4'-dihydroxybiphenyl, 112 parts by weight of terephthalic acid, 346 parts by weight of polyethylene terephthalate having an intrinsic viscosity of about 0.6 dl/g, and 884 parts by weight (1.10 equivalents of the total of phenolic hydroxyl groups) of acetic anhydride were charged and, after reacting at 145° C. for 85 minutes while stirring in a nitrogen gas atmosphere, the temperature was raised from 145° C. to 290° C. over 4 hours. At this time, the reaction time at the internal temperature of 140 to 145° C. was 80 minutes. Thereafter, the polymerization temperature was maintained at 290° C. and the pressure was reduced to 1.0 mmHg (133 Pa) over 1.0 hour, and after continuously reacting for additional 20 minutes, the polymerization was completed when the torque required for stirring reached 20 kg·cm. Then, the inside of the reaction vessel was pressurized to 1.0 kg/cm' (0.1 MPa) and the polymer was extruded into strands through a spinneret with one circular outlet having a diameter of 10 mm, followed by pelletization using a cutter to obtain a liquid crystal polyester resin (a-5).

When the composition of this liquid crystal polyester resin (a-5) was analyzed, the structural unit derived from p-hydroxybenzoic acid was 56.9 mol %, the structural unit derived from 4,4'-dihydroxybiphenyl was 5.9 mol %, the structural unit derived from terephthalic acid was 21.6 mol %, and the structural unit derived from ethylene glycol was 15.7 mol %. Tm was 263° C., the melt viscosity was 13 Pa·s, the absolute number-average molecular weight was 10,500, and the absolute weight-average molecular weight was 25,000.

Example 6

In a 5 L reaction vessel equipped with a stirring blade and a distillation tube, 528 parts by weight of p-hydroxybenzoic acid, 126 parts by weight of 4,4'-dihydroxybiphenyl, 112 parts by weight of terephthalic acid, 865 parts by weight of polyethylene terephthalate having an intrinsic viscosity of about 0.6 dl/g, and 581 parts by weight (1.10 equivalents of the total of phenolic hydroxyl groups) of acetic anhydride were charged and, after reacting at 145° C. for 90 minutes while stirring in a nitrogen gas atmosphere, the temperature was raised from 145° C. to 290° C. over 4 hours. At this time, the reaction time at the internal temperature of 140 to 145° C. was 85 minutes. Thereafter, the polymerization temperature was maintained at 290° C. and the pressure was reduced to 1.0 mmHg (133 Pa) over 1.0 hour, and after continuously reacting for additional 30 minutes, the polymerization was completed when the torque required for stirring reached 20 kg·cm. Then, the inside of the reaction vessel was pressurized to 1.0 kg/cm' (0.1 MPa) and the polymer was extruded into strands through a spinneret with one circular outlet having a diameter of 10 mm, followed by pelletization using a cutter to obtain a liquid crystal polyester resin (a-6).

When the composition of this liquid crystal polyester resin (a-6) was analyzed, the structural unit derived from p-hydroxybenzoic acid was 27.0 mol %, the structural unit derived from 4,4'-dihydroxybiphenyl was 4.8 mol %, the structural unit derived from terephthalic acid was 36.5 mol %, and the structural unit derived from ethylene glycol was 31.7 mol %. Tm was 210° C., the melt viscosity was 50 Pa·s, the absolute number-average molecular weight was 12,800, and the absolute weight-average molecular weight was 36,000.

Example 7

In a 5 L reaction vessel equipped with a stirring blade and a distillation tube, 994 parts by weight of p-hydroxybenzoic acid, 126 parts by weight of 4,4'-dihydroxybiphenyl, 112 parts by weight of terephthalic acid, 216 parts by weight of polyethylene terephthalate having an intrinsic viscosity of about 0.6 dl/g, and 960 parts by weight (1.10 equivalents of the total of phenolic hydroxyl groups) of acetic anhydride were charged and, after reacting at 145° C. for 110 minutes while stirring in a nitrogen gas atmosphere, the temperature was raised from 145° C. to 320° C. over 4 hours. At this time, the reaction time at the internal temperature of 140 to 145° C. was 105 minutes. Thereafter, the polymerization temperature was maintained at 320° C. and the pressure was reduced to 1.0 mmHg (133 Pa) over 1.0 hour, and after continuously reacting for additional 10 minutes, the polymerization was completed when the torque required for stirring reached 20 kg·cm. Then, the inside of the reaction vessel was pressurized to 1.0 kg/cm' (0.1 MPa) and the polymer was extruded into strands through a spinneret with one circular outlet having a diameter of 10 mm, followed by pelletization using a cutter to obtain a liquid crystal polyester resin (a-7).

When the composition of this liquid crystal polyester resin (a-7) was analyzed, the structural unit derived from p-hydroxybenzoic acid was 66.7 mol %, the structural unit derived from 4,4'-dihydroxybiphenyl was 6.3 mol %, the structural unit derived from terephthalic acid was 16.7 mol %, and the structural unit derived from ethylene glycol was 10.4 mol %. Tm was 313° C., the melt viscosity was 13 Pa·s, the absolute number-average molecular weight was 11,000, and the absolute weight-average molecular weight was 25,200.

Example 8

In a 5 L reaction vessel equipped with a stirring blade and a distillation tube, 994 parts by weight of p-hydroxybenzoic acid, 126 parts by weight of 4,4'-dihydroxybiphenyl, 112 parts by weight of terephthalic acid, 216 parts by weight of polyethylene terephthalate having an intrinsic viscosity of about 0.6 dl/g, and 960 parts by weight (1.10 equivalents of the total of phenolic hydroxyl groups) of acetic anhydride were charged and, after reacting at 145° C. for 50 minutes while stirring in a nitrogen gas atmosphere, the temperature was raised from 145° C. to 320° C. over 4 hours. At this time, the reaction time at the internal temperature of 140 to 145° C. was 43 minutes. Thereafter, the polymerization temperature was maintained at 320° C. and the pressure was reduced to 1.0 mmHg (133 Pa) over 1.0 hour, and after continuously reacting for additional 60 minutes, the polymerization was completed when the torque required for stirring reached 20 kg·cm. Then, the inside of the reaction vessel was pressurized to 1.0 kg/cm' (0.1 MPa) and the polymer was extruded into strands through a spinneret with one circular outlet having a diameter of 10 mm, followed by pelletization using a cutter to obtain a liquid crystal polyester resin (a-8).

When the composition of this liquid crystal polyester resin (a-8) was analyzed, the structural unit derived from p-hydroxybenzoic acid was 66.7 mol %, the structural unit derived from 4,4'-dihydroxybiphenyl was 6.3 mol %, the structural unit derived from terephthalic acid was 16.7 mol %, and the structural unit derived from ethylene glycol was 10.4 mol %. Tm was 313° C., the melt viscosity was 13 Pa·s, the absolute number-average molecular weight was 8,200, and the absolute weight-average molecular weight was 25,500.

Example 9

In a 5 L reaction vessel equipped with a stirring blade and a distillation tube, 994 parts by weight of p-hydroxybenzoic acid, 126 parts by weight of 4,4'-dihydroxybiphenyl, 112 parts by weight of terephthalic acid, 216 parts by weight of polyethylene terephthalate having an intrinsic viscosity of about 0.6 dl/g, and 960 parts by weight (1.10 equivalents of the total of phenolic hydroxyl groups) of acetic anhydride were charged and, after reacting at 145° C. for 80 minutes while stirring in a nitrogen gas atmosphere, the temperature was raised from 145° C. to 320° C. over 4 hours. At this time, the reaction time at the internal temperature of 140 to 145° C. was 43 minutes. Thereafter, the polymerization temperature was maintained at 320° C. and the pressure was reduced to 1.0 mmHg (133 Pa) over 1.0 hour, and after continuously reacting for additional 10 minutes, the polymerization was completed when the torque required for stirring reached 10 kg·cm. Then, the inside of the reaction vessel was pressurized to 1.0 kg/cm' (0.1 MPa) and the polymer was extruded into strands through a spinneret with one circular outlet having a diameter of 10 mm, followed by pelletization using a cutter to obtain a liquid crystal polyester resin (a-9).

When the composition of this liquid crystal polyester resin (a-9) was analyzed, the structural unit derived from p-hydroxybenzoic acid was 66.7 mol %, the structural unit derived from 4,4'-dihydroxybiphenyl was 6.3 mol %, the structural unit derived from terephthalic acid was 16.7 mol %, and the structural unit derived from ethylene glycol was 10.4 mol %. Tm was 310° C., the melt viscosity was 3 Pa·s, the absolute number-average molecular weight was 5,500, and the absolute weight-average molecular weight was 16,000.

Example 10

In a 5 L reaction vessel equipped with a stirring blade and a distillation tube, 994 parts by weight of p-hydroxybenzoic acid, 126 parts by weight of 4,4'-dihydroxybiphenyl, 112 parts by weight of isophthalic acid, 216 parts by weight of polyethylene terephthalate having an intrinsic viscosity of about 0.6 dl/g, and 960 parts by weight (1.10 equivalents of the total of phenolic hydroxyl groups) of acetic anhydride were charged and, after reacting at 145° C. for 80 minutes while stirring in a nitrogen gas atmosphere, the temperature was raised from 145° C. to 320° C. over 4 hours. At this time, the reaction time at the internal temperature of 140 to 145° C. was 75 minutes. Thereafter, the polymerization temperature was maintained at 320° C. and the pressure was reduced to 1.0 mmHg (133 Pa) over 1.0 hour, and after continuously reacting for additional 20 minutes, the polymerization was completed when the torque required for stirring reached 20 kg·cm. Then, the inside of the reaction vessel was pressurized to 1.0 kg/cm' (0.1 MPa) and the polymer was extruded into strands through a spinneret with one circular outlet having a diameter of 10 mm, followed by pelletization using a cutter to obtain a liquid crystal polyester resin (a-10).

When the composition of this liquid crystal polyester resin (a-10) was analyzed, the structural unit derived from p-hydroxybenzoic acid was 66.7 mol %, the structural unit derived from 4,4'-dihydroxybiphenyl was 6.3 mol %, the structural unit derived from isophthalic acid was 16.7 mol %, and the structural unit derived from ethylene glycol was 10.4 mol %. Tm was 305° C., the melt viscosity was 13 Pa·s, the absolute number-average molecular weight was 9,500, and the absolute weight-average molecular weight was 26,000.

Example 11

In a 5 L reaction vessel equipped with a stirring blade and a distillation tube, 870 parts by weight of p-hydroxybenzoic acid, 352 parts by weight of 4,4'-dihydroxybiphenyl, 89 parts by weight of hydroquinone, 292 parts by weight of terephthalic acid, 157 parts by weight of isophthalic acid, and 1,314 parts by weight (1.10 equivalents of the total of phenolic hydroxyl groups) of acetic anhydride were charged and, after reacting at 145° C. for 90 minutes while stirring in a nitrogen gas atmosphere, the temperature was raised from 145° C. to 330° C. over 4 hours. At this time, the reaction time at the internal temperature of 140 to 145° C. was 85 minutes. Thereafter, the polymerization temperature was maintained at 330° C. and the pressure was reduced to 1.0 mmHg (133 Pa) over 1.0 hour, and after continuously reacting for additional 10 minutes, the polymerization was completed when the torque required for stirring reached 10 kg·cm. Then, the inside of the reaction vessel was pressurized to 1.0 kg/cm' (0.1 MPa) and the polymer was extruded into strands through a spinneret with one circular outlet having a diameter of 10 mm, followed by pelletization using a cutter to obtain a liquid crystal polyester resin (a-11).

When the composition of this liquid crystal polyester resin (a-11) was analyzed, the structural unit derived from p-hydroxybenzoic acid was 53.8 mol %, the structural unit derived from 4,4'-dihydroxybiphenyl was 16.2 mol %, the structural unit derived from hydroquinone was 6.9%, the structural unit derived from terephthalic acid was 15.0 mol %, and the structural unit derived from isophthalic acid was 8.1 mol %. Tm was 310° C., the melt viscosity was 13 Pa·s, the absolute number-average molecular weight was 9,500, and the absolute weight-average molecular weight was 21,000.

Comparative Example 1

In a 5 L reaction vessel equipped with a stirring blade and a distillation tube, 994 parts by weight of p-hydroxybenzoic acid, 126 parts by weight of 4,4'-dihydroxybiphenyl, 112 parts by weight of terephthalic acid, 216 parts by weight of polyethylene terephthalate having an intrinsic viscosity of about 0.6 dl/g, and 960 parts by weight (1.10 equivalents of the total of phenolic hydroxyl groups) of acetic anhydride were charged and, after reacting at 145° C. for 120 minutes while stirring in a nitrogen gas atmosphere, the temperature was raised from 145° C. to 320° C. over 4 hours. At this time, the reaction time at the internal temperature of 140 to 145° C. was 115 minutes. Thereafter, the polymerization temperature was maintained at 320° C. and the pressure was reduced to 1.0 mmHg (133 Pa) over 1.0 hour, and after continuously reacting for additional 2 minutes, the polymerization was completed when the torque required for stirring reached 20 kg·cm. Then, the inside of the reaction vessel was pressurized to 1.0 kg/cm' (0.1 MPa) and the polymer was extruded into strands through a spinneret with one circular outlet having a diameter of 10 mm, followed by pelletization using a cutter to obtain a liquid crystal polyester resin (a-12).

When the composition of this liquid crystal polyester resin (a-12) was analyzed, the structural unit derived from p-hydroxybenzoic acid was 66.7 mol %, the structural unit derived from 4,4'-dihydroxybiphenyl was 6.3 mol %, the structural unit derived from terephthalic acid was 16.7 mol %, and the structural unit derived from ethylene glycol was 10.4 mol %. Tm was 313° C., the melt viscosity was 13 Pa·s, the absolute number-average molecular weight was 12,500, and the absolute weight-average molecular weight was 25,500.

Comparative Example 2

In a 5 L reaction vessel equipped with a stirring blade and a distillation tube, 994 parts by weight of p-hydroxybenzoic acid, 126 parts by weight of 4,4'-dihydroxybiphenyl, 112 parts by weight of terephthalic acid, 216 parts by weight of polyethylene terephthalate having an intrinsic viscosity of about 0.6 dl/g, and 960 parts by weight (1.10 equivalents of the total of phenolic hydroxyl groups) of acetic anhydride were charged and, after reacting at 145° C. for 120 minutes while stirring in a nitrogen gas atmosphere, the temperature was raised from 145° C. to 320° C. over 4 hours. At this time, the reaction time at the internal temperature of 140 to 145° C. was 115 minutes. Thereafter, the polymerization temperature was maintained at 320° C. and the pressure was reduced to 1.0 mmHg (133 Pa) over 1.0 hour, and after continuously reacting for additional 15 minutes, the polymerization was completed when the torque required for stirring reached 40 kg·cm. Then, the inside of the reaction vessel was pressurized to 1.0 kg/cm$^2$ (0.1 MPa) and the polymer was extruded into strands through a spinneret with one circular outlet having a diameter of 10 mm, followed by pelletization using a cutter to obtain a liquid crystal polyester resin (a-13).

When the composition of this liquid crystal polyester resin (a-13) was analyzed, the structural unit derived from p-hydroxybenzoic acid was 66.7 mol %, the structural unit derived from 4,4'-dihydroxybiphenyl was 6.3 mol %, the structural unit derived from terephthalic acid was 16.7 mol %, and the structural unit derived from ethylene glycol was 10.4 mol %. Tm was 313° C., the melt viscosity was 40 Pa·s, the absolute number-average molecular weight was 19,200, and the absolute weight-average molecular weight was 38,500.

Comparative Example 3

In a 5 L reaction vessel equipped with a stirring blade and a distillation tube, 870 parts by weight of p-hydroxybenzoic acid, 352 parts by weight of 4,4'-dihydroxybiphenyl, 89 parts by weight of hydroquinone, 292 parts by weight of terephthalic acid, 157 parts by weight of isophthalic acid, and 1,314 parts by weight (1.10 equivalents of the total of phenolic hydroxyl groups) of acetic anhydride were charged and, after reacting at 145° C. for 120 minutes while stirring in a nitrogen gas atmosphere, the temperature was raised from 145° C. to 330° C. over 4 hours. At this time, the reaction time at the internal temperature of 140 to 145° C. was 115 minutes. Thereafter, the polymerization temperature was maintained at 330° C. and an attempt was made to reduce the pressure to 1.0 mmHg (133 Pa) over 1.0 hour, but the torque reached 10 kg·cm before reaching 1.0 mmHg. Then, the inside of the reaction vessel was pressurized to 1.0 kg/cm' (0.1 MPa) and the polymer was extruded into strands through a spinneret with one circular outlet having a diameter of 10 mm, followed by pelletization using a cutter to obtain a liquid crystal polyester resin (a-14).

When the composition of this liquid crystal polyester resin (a-14) was analyzed, the structural unit derived from p-hydroxybenzoic acid was 53.8 mol %, the structural unit derived from 4,4'-dihydroxybiphenyl was 16.2 mol %, the structural unit derived from hydroquinone was 6.9 mol %, the structural unit derived from terephthalic acid was 15.0 mol %, and the structural unit derived from isophthalic acid was 8.1 mol %. Tm was 310° C., the melt viscosity was 13 Pa·s, the absolute number-average molecular weight was 11,500, and the absolute weight-average molecular weight was 21,500.

Comparative Example 4

In a 5 L reaction vessel equipped with a stirring blade and a distillation tube, 218 parts by weight of p-hydroxybenzoic acid, 126 parts by weight of 4,4'-dihydroxybiphenyl, 112 parts by weight of terephthalic acid, 1,297 parts by weight of polyethylene terephthalate having an intrinsic viscosity of about 0.6 dl/g, and 328 parts by weight (1.10 equivalents of the total of phenolic hydroxyl groups) of acetic anhydride were charged and, after reacting at 145° C. for 80 minutes while stirring in a nitrogen gas atmosphere, the temperature was raised from 145° C. to 290° C. over 4 hours. At this time, the reaction time at the internal temperature of 140 to 145° C. was 75 minutes. Thereafter, the polymerization temperature was maintained at 290° C. and the pressure was reduced to 1.0 mmHg (133 Pa) over 1.0 hour, and after continuously reacting for additional 60 minutes, the polymerization was completed when the torque required for stirring reached 20 kg·cm. Then, the inside of the reaction vessel was pressurized to 1.0 kg/cm² (0.1 MPa) and the polymer was extruded into strands through a spinneret with one circular outlet having a diameter of 10 mm, followed by pelletization using a cutter to obtain a polyester resin (a-15). The obtained polyester resin did not exhibit liquid crystallinity.

When the composition of this polyester resin (a-15) was analyzed, the structural unit derived from p-hydroxybenzoic acid was 9.6 mol %, the structural unit derived from 4,4'-dihydroxybiphenyl was 4.1 mol %, the structural unit derived from terephthalic acid was 45.2 mol %, and the structural unit derived from ethylene glycol was 41.1 mol %. Tm was 205° C., the melt viscosity was 50 Pa·s, the absolute number-average molecular weight was 12,500, and the absolute weight-average molecular weight was 38,500.

Subsequently, the metal adhesion and tensile properties were evaluated by the following methods.

(5) Metal Adhesion

The thus obtained liquid crystal polyester resins (a-1) to (a-14) and polyester resins (a-15) were crushed into powders using a coarse crusher. Relative to 100 weight of the obtained powders, 2,000 parts by weight of pentafluorophenol was added to (a-11), (a-13) and (a-14), while 1,300 parts by weight of pentafluorophenol was added to other resins. Each liquid crystal polyester resin or polyester resin was completely dissolved by heating to 130° C., followed by stirring and defoaming to obtain a brown transparent solution. The solution thus obtained was cast on a rolled copper foil (manufactured by JX Nippon Mining & Metals Corporation, 12 μm in thickness) using a film applicator, heated to 80° C. on a hot plate to remove the solvent, and then subjected to a heat treatment at the melting point (–10° C.) of each liquid crystal polyester resin or polyester resin for 1 hour to obtain a copper-clad laminate. Subsequently, the copper-clad laminate thus obtained was cut into a strip having a width of 10 mm and each liquid crystal polyester resin or polyester resin layer was fixed with a double-sided tape. Then, the peel strength (kgf/cm) at the time of peeling a copper foil at a speed of 50 mm/min was measured to be perpendicular to each resin layer and a copper foil was applied to each resin layer in accordance with JIS C6481 (1996). The higher the peel strength, the better the metal adhesion.

(6) Tensile Properties

Relative to the copper-clad laminate obtained in (5), the copper foil was removed with a ferric chloride solution to obtain a liquid crystal polyester resin or polyester resin film having a thickness of 20 μm. The film was cut into a tensile test No. 3 dumbbell with a parallel part width of 5 mm and a length of 20 mm relative to JIS K6251(2010), and then a tensile test was performed at a tensile speed of 5 mm/min according to JIS K7161(2014) to determine the elongation (%). The higher the tensile elongation, the better the tensile properties.

Table 1 shows the evaluation results of the measurement of properties of pellets obtained in Examples 1 to 11 and Comparative Examples 1 to 5 by the above method.

TABLE 1

| | Liquid polyester resin crystal | Absolute molecular weight of liquid crystal polyester resin | | Composition of liquid crystal polyester resin (mol %) | | | | Acetylation reaction time at 140 to 145° C. | Metal adhesion Peel strength (kgf/cm) | Tensile properties Tensile elongation (%) |
|---|---|---|---|---|---|---|---|---|---|---|
| | | Area fraction at absolute molecular weight of 10,000 or less (%) | Area fraction at absolute molecular weight of 50,000 or more (%) | Structural unit derived from aliphatic diol | Structural unit derived from aromatic hydroxy-carboxylic acid | Structural unit derived from aromatic diol | Structural unit derived from aromatic carboxylic acid | | | |
| Example 1 | a-1 | 15 | 12 | 10.4 | 66.7 | 6.3 | 16.7 | 75 | 0.55 | 32 |
| Example 2 | a-2 | 18 | 13 | 10.4 | 66.7 | 6.3 | 16.7 | 75 | 0.59 | 35 |
| Example 3 | a-3 | 18 | 13 | 10.4 | 66.4 | 6.6 | 16.6 | 75 | 0.58 | 35 |
| Example 4 | a-4 | 16 | 13 | 11.5 | 64.6 | 6.2 | 17.7 | 70 | 0.56 | 33 |
| Example 5 | a-5 | 16 | 12 | 15.7 | 56.9 | 5.9 | 21.6 | 80 | 0.57 | 33 |
| Example 6 | a-6 | 12 | 15 | 31.7 | 27.0 | 4.8 | 36.5 | 85 | 0.50 | 30 |

TABLE 1-continued

| | | Absolute molecular weight of liquid crystal polyester resin | | Composition of liquid crystal polyester resin (mol %) | | | | | | |
|---|---|---|---|---|---|---|---|---|---|---|
| | Liquid polyester resin crystal | Area fraction at absolute molecular weight of 10,000 or less (%) | Area fraction at absolute molecular weight of 50,000 or more (%) | Structural unit derived from aliphatic diol | Structural unit derived from aromatic hydroxy-carboxylic acid | Structural unit derived from aromatic diol | Structural unit derived from aromatic carboxylic acid | Acetylation reaction time at 140 to 145° C. | Metal adhesion Peel strength (kgf/cm) | Tensile properties Tensile elongation (%) |
| Example 7 | a-7 | 11 | 9 | 10.4 | 66.7 | 6.3 | 16.7 | 105 | 0.47 | 27 |
| Example 8 | a-8 | 25 | 18 | 10.4 | 66.7 | 6.3 | 16.7 | 43 | 0.46 | 27 |
| Example 9 | a-9 | 35 | 5 | 10.4 | 66.7 | 6.3 | 16.7 | 75 | 0.51 | 30 |
| Example 10 | a-10 | 16 | 12 | 10.4 | 66.7 | 6.3 | 16.7 | 75 | 0.55 | 32 |
| Example 11 | a-11 | 28 | 5 | 0.0 | 53.8 | 23.1 | 23.1 | 75 | 0.40 | 24 |
| Comparative Example 1 | a-12 | 9 | 6 | 10.4 | 66.7 | 6.3 | 16.7 | 115 | 0.30 | 18 |
| Comparative Example 2 | a-13 | 6 | 21 | 10.4 | 66.7 | 6.3 | 16.7 | 115 | 0.24 | 20 |
| Comparative Example 3 | a-14 | 20 | 2 | 0.0 | 53.8 | 23.1 | 23.1 | 115 | 0.22 | 16 |
| Comparative Example 4 | a-15 | 9 | 19 | 41.1 | 9.6 | 4.1 | 45.2 | 75 | 0.22 | 18 |

The results in Table 1 reveal that the film made of our liquid crystal polyester resin is excellent in metal adhesion and tensile properties.

Examples 12 to 23, Reference Examples 1 to 4

The liquid crystal polyester resin was crushed into powders using a coarse crusher and the liquid crystal polyester resin mixed with phenols (A) and a protic solvent (B) in each amount shown in Table 2, and then the following evaluations (7) to (9) were performed. The phenols (A) and protic solvent (B) used in each example are as shown below.

(A-1) Pentafluorophenol (melting point of 34° C., boiling point of 143° C., pKa of 5.5)
(B-1) o-Chlorophenol (melting point of 8° C., boiling point of 175° C., pKa of 8.5)
(B-2) m-Fluorophenol (melting point of 8° C., boiling point of 178° C., pKa of 9.3)
(B-3) m-Cresol (melting point of 8° C., boiling point of 203° C., pKa of 10.0)
(B-4) Hexafluoroisopropanol (melting point of −4° C., boiling point of 59° C., pKa of 9.3)

(7) Solubility

The resin powder and the solvent were stirred for 24 hours at the temperature which is 10° C. lower than either the boiling point of the solvent (A) or that of the solvent (B), whichever lower, to obtain a liquid crystal polyester resin composition. When the liquid crystal polyester resin was completely dissolved to obtain a brown transparent and uniform solution was rated "A," when the liquid crystal polyester resin is brown and transparent, and a non-uniform solution is obtained was rated "B," and when the liquid crystal polyester resin remains without being dissolved was rated "C." The solubility is excellent in the order of A, B and C.

(8) Film-Forming Properties (Liquefaction Temperature, Thickness Uniformity)

The liquid crystal polyester resin composition rated A or B in the evaluation (7) was cooled to 25° C. to solidify the liquid crystal polyester resin composition. Then, the temperature was raised by 5° C. every 10 minutes and the temperature at which the resin composition was liquefied (liquefaction temperature) was measured. The lower the liquefaction temperature, the better the film-forming properties. Subsequently, the thus obtained solution was applied onto an aluminum foil (12 μm in thickness) using a film applicator, heated to the liquefaction temperature on a hot plate to remove the solvent, and then a heat treatment was performed at the temperature, which is the melting point of each liquid crystal polyester resin−10° C., to fabricate a liquid crystal polyester resin film (average thickness of 50 μm). The thus obtained liquid crystal polyester resin film was peeled off from the aluminum foil, and the thickness was measured at any 30 points using a micrometer. For the thicknesses at these 30 points, the value of (standard deviation of thickness)/(average thickness) (%) was calculated. The smaller this value, the more uniform the thickness and the better the film-forming properties. When the viscosity of the solution was low and the average thickness was less than 50 μm, coating of the solution and removal of the solvent were repeated to fabricate a liquid crystal polyester resin film having an average thickness of 50 μm.

(9) Occurrence of Cracks During Film Formation

For the liquid crystal polyester resin composition subjected to the evaluation (7), the thus obtained solution was applied onto an aluminum foil (12 μm in thickness) using a film applicator. After removing the solvent by heating to the liquefaction temperature measured in (7)+20° C. on a hot plate in an exhaust atmosphere, a heat treatment was performed at the melting point of each liquid crystal polyester resin−10° C. for 1 hour to fabricate a liquid crystal polyester resin film to have an average thickness of 50 μm. At this time, the crack resistance was evaluated as follows. When cracks of 1 cm or more occurred was rated "C," when cracks of less than 1 cm occurred was rate "B," and when no cracks occurred was rated "A." The crack resistance is excellent in the order of A, B and C. When the viscosity of the solution was low and the average thickness was less than 50 μm, coating of the solution and removal of the solvent were repeated to evaluate the occurrence of cracks when the average thickness reached 50 μm.

TABLE 2

| | Liquid crystal polyester resin (A) (parts by weight) | Phenols (B) (parts by weight) | Protic solvent (C) (parts by weight) | Solubility | Liquefaction Temperature (° C.) | Film Thickness uniformity (%) | Occurrence of cracks during film formation |
|---|---|---|---|---|---|---|---|
| Example 12 | a-1 (100) | A-1 (720) | B-1 (180) | A | 70 | 3 | A |
| Example 13 | a-1 (100) | A-1 (720) | B-2 (180) | A | 70 | 3 | A |
| Example 14 | a-1 (100) | A-1 (720) | B-3 (180) | A | 85 | 7 | A |
| Example 15 | a-1 (100) | A-1 (1,520) | B-4 (380) | A | 100 | 12 | B |
| Example 16 | a-5 (100) | A-1 (720) | B-1 (180) | A | 60 | 3 | A |
| Example 17 | a-11 (100) | A-1 (1,520) | B-1 (380) | A | 90 | 7 | A |
| Example 18 | a-6 (100) | A-1 (1,520) | B-1 (380) | A | 50 | 5 | A |
| Example 19 | a-1 (100) | A-1 (1,520) | B-1 (380) | A | 50 | 4 | A |
| Example 20 | a-1 (100) | A-1 (2,700) | B-1 (180) | A | 50 | 13 | B |
| Example 21 | a-5 (100) | A-1 (480) | B-1 (120) | A | 70 | 3 | A |
| Example 22 | a-6 (100) | A-1 (200) | B-1 (40) | A | 70 | 6 | A |
| Example 23 | a-1 (100) | A-1 (720) | B-1 (1,280) | A | 70 | 13 | B |
| Reference Example 1 | a-1 (100) | A-1 (1,300) | — | A | 140 | 21 | C |
| Reference Example 2 | a-5 (100) | A-1 (1,300) | — | A | 130 | 20 | C |
| Reference Example 3 | a-6 (100) | A-1 (1,300) | — | A | 120 | 22 | C |
| Reference Example 4 | a-11 (100) | A-1 (2,000) | — | A | 140 | 25 | C |

As is apparent from the results in Table 2, it is possible to obtain a film which is free from cracks and has a uniform thickness by using our liquid crystal polyester resin composition including the liquid crystal polyester resin for laminate, the phenols (A) and the protic solvent (B).

INDUSTRIAL APPLICABILITY

Our liquid crystal polyester resin for laminate is excellent in metal adhesion and tensile properties when formed into a film. According to our liquid crystal polyester resin composition, it is possible to obtain a film free from cracks and has a uniform thickness. Our laminate is suitably used for a laminate used for circuit boards such as flexible printed wiring boards and rigid printed wiring boards in electric/electronic components and mechanical components, and semiconductor packages.

The invention claimed is:

1. A liquid crystal polyester resin for laminate, wherein, in a molecular weight distribution of an absolute molecular weight measured by a gel permeation chromato-graph/light scattering method, an area fraction of a portion having an absolute molecular weight of 10,000 or less is 10 to 40%, and an area fraction of a portion having an absolute molecular weight of 50,000 or more is 3 to 20%, relative to 100% of the total peak area,
wherein the liquid crystal polyester resin includes 3 to 40 mol % of a structural unit derived from an aliphatic diol having 2 to 4 carbon atoms relative to 100 mol % of the total structural unit of the liquid crystal polyester resin.

2. The liquid crystal polyester resin according to claim 1, wherein the total of a structural unit derived from an aromatic hydroxycarboxylic acid and a structural unit derived from terephthalic acid is 60 to 100 mol % relative to 100 mol % of the total structural unit of the liquid crystal polyester resin.

3. The liquid crystal polyester resin according to claim 1, including 15 to 80 mol % of a structural unit derived from an aromatic hydroxycarboxylic acid, 3 to 20 mol % of a structural unit derived from an aromatic diol and 7 to 40 mol % of a structural unit derived from an aromatic dicarboxylic acid, relative to 100 mol % of the total structural unit of the liquid crystal polyester resin.

4. A liquid crystal polyester resin composition comprising the liquid crystal polyester resin according to claim 1 and a solvent, wherein 100 to 10,000 parts by weight of the solvent is included relative to 100 parts by weight of the liquid crystal polyester resin.

5. The liquid crystal polyester resin composition according to claim 4, wherein the solvent includes 50 to 3,000 parts by weight of a phenol (A) in which three or more hydrogen atoms bonded to the benzene ring are substituted with fluorine atoms, and 1 to 1,500 parts by weight of a protic solvent (B) having a melting point of 30° C. or lower and an acid dissociation constant (pKa) of 4 to 12, relative to 100 parts by weight of the liquid crystal polyester resin.

6. The liquid crystal polyester resin composition according to claim 5, wherein the protic solvent (B) is phenols.

7. The liquid crystal polyester resin composition according to claim 5, wherein the protic solvent (B) is at least one compound selected from the group consisting of o-fluorophenol, m-fluorophenol, o-chlorophenol, o-bromophenol, 4-chloro-2-fluorophenol, 2-chloro-4-fluorophenol and 3,5-bis(trifluoromethyl)phenol.

8. The liquid crystal polyester resin composition according to claim 4, which is liquid at the temperature of 100° C. or lower.

9. A method of producing a laminate comprising applying the liquid crystal polyester resin composition according to claim 4 onto a support and removing the solvent.

10. The method according to claim 9, wherein the support is a metal foil.

11. A method of producing a liquid crystal polyester resin film comprising removing the support from the laminate obtained by the method according to claim 9 to obtain a liquid crystal polyester resin film.

12. A liquid crystal polyester resin film comprising the liquid crystal polyester resin according to claim 1.

13. A laminate comprising a support and a resin layer that are mutually laminated, wherein the support is laminated on at least one surface of the resin layer made of the liquid crystal polyester resin according to claim 1.

14. The laminate according to claim 13, wherein the support is a metal foil.

* * * * *